2,743,248

SINGLE STAGE PROCESS OF POLYCONDENSATION OF ALKYLENE-ALKYLIDENE AND ARALKYLIDENE-BIS-HALOGEN SUBSTITUTED-CARBOXYLIC ACID AMIDES

Rudolf Lotz, Klingenberg (Main), Germany, assignor to Vereinigte Glanzstoff-Fabriken A. G., Wuppertal-Elberfeld, Germany No Drawing. Application December 26, 1952, Serial No. 328,142

Claims priority, application Germany December 31, 1951

6 Claims. (Cl. 260—2)

This invention relates to polycondensation, and more particularly to methods of preparing polycondensates from bis-halogen substituted-carboxylic acid amides, and the polycondensation products thus obtained.

It is an object of this invention to prepare polycondensates from bis-halogen substituted-carboxylic acid amides, by a single stage process.

Other objects, and the manner in which the same are attained, will become apparent as this specification proceeds.

In a copending application filed of even date herewith, Serial Number 328,141 which is a continuation-in-part of my application for U. S. Letters Patent Serial Number 299,734, filed July 18, 1952, I disclose methods of preparing polycondensates from bis-halogen substituted-carboxylic acid amides which involve reacting an alkylene-, alkylidene- or aralkylidene-bis-halogen substituted-carboxylic acid amide of the formula

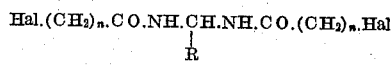

wherein R stands for hydrogen, or an alkyl- or aryl-group, Hal signifies halogen, and $n$ is an integer from 1 to 6, with liquid ammonia, in an autoclave, at normal or slightly elevated temperature, whereby to obtain an intermediate product which is a mono- or diamino compound of the particular bis-halogen substituted-carboxylic acid amide used in the reaction. While this first stage of the process is common to the several methods disclosed in the said copending application, the second stage may vary. The intermediate product may undergo further treatment by being heated, in a current of nitrogen, at temperatures up to about 250° C., or it may be heated, in vacuo, above its melting point, or it may be reacted with an aliphatic or aromatic dicarboxylic acid. In a preferred embodiment, the intermediate product may receive an addition of a small quantity of hydroxides, hydrosulfides or carbonates of alkali metals or alkali earth metals, to be thereafter molten at normal pressure while introducing nitrogen, and subsequently heated in vacuo, to a temperature ranging from 100 to 250° C.

In a further development of and as an improvement over the concepts of the invention disclosed in my copending applicaiton referred to above, I have discovered that the preparation of polycondensates from bis-halogen substituted-carboxylic acid amides proceeds in a single stage process, provided certain conditions are met as will be explained below in detail.

The present invention contemplates reacting an alkylen-, alkylidene- or aralkylidene-bis-halogen substituted-carboxylic acid amide of the formula

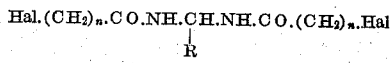

wherein R stands for hydrogen, or an alkyl- or aryl-group, Hal signifies halogen, and $n$ is an integer from 1 to 6, in a closed vessel, at room temperature, with an equimolecular quantity of liquid ammonia, in the presence of a nitrogenous heterocyclic catalyst.

With certain starting materials the polycondensates obtained when operating in accordance with the broad concepts of the invention as stated above, display a yellowish coloration. In instances and for uses where this coloration would be objectionable, the invention contemplates having the reaction proceed in a high vacuum, i. e. at pressures below about 1 mm. Hg.

The basic concept of the invention is based on my discovery that while any excess of ammonia present during the reaction leads to intermediate products which require a second process stage for conversion into the desired polycondensates, the second process stage can be eliminated, and the desired polycondensates can be obtained in a single stage procedure, provided the quantity of ammonia is carefully dosed to correspond just to the equimolecular quantity, avoiding any excess of ammonia, and provided further a nitrogenous, heterocyclic catalyst is present during the reaction.

The nitrogenous heterocyclic catalysts contemplated by the invention may be exemplified by the following: pyridine, quinoline, piperidine, α-pyridine carboxylic acid, β-pyridine carboxylic acid, or carbazole. Quantities of from about 0.01 to about 1 gram of catalyst are contemplated.

The invention will be more fully described by reference to the following specific examples. It should be understood, however, that the examples are given by way of illustration only and that the invention is not to be limited by the details set forth therein.

Example I 60 grams of methylene-bis-chloropropionic acid amide are reacted, in the presence of 0.3 gram of pyridine, with 200 cc. of liquid ammonia, in a closed vessel, at room temperature. When the reaction has proceeded for about 15 hours, a lightly colored polycondensation product is isolated which is eminently suitable for the production of plastic masses.

Example II 85 grams of methylene-bis-bromopropionic acid amide are reacted, in the presence of 0.4 gram of piperidine, with 200 cc. of liquid ammonia, under the conditions and with results described with reference to Example I.

Example III 64 grams of ethylidene-bis-chloropropionic acid amide are reacted, in the presence of 0.3 gram of pyridine, with 205 cc. of liquid ammonia, in a closed vessel, at room temperature. When the reaction has proceeded for about 15 hours, a yellowish polycondensation product is isolated which is excellently suited for the production of plastic masses.

If the yellowish coloration is objectionable, the reaction is carried out in a high vacuum, at a pressure below 1 mm. Hg with the result that the polycondensates recovered after completion of the reaction, no longer display any objectionable yellowish coloration.

Example IV 90 grams of trichloroethylidene-bis-chloropropionic acid amide of the formula

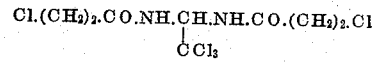

are reacted, in the presence of 0.3 gram of pyridine, with 205 cc. of liquid ammonia, under the conditions and with the results set forth with reference to Example III.

Example V 82 grams of benzylidene-bis-bromopropionic acid amide of the formula

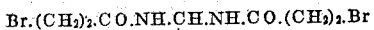
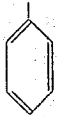

are reacted, in the presence of 0.5 gram of piperidine, with 200 cc. of liquid ammonia, in a closed vessel, at room temperature. When the reaction has proceeded for about 15 hours, a lightly colored polycondensation product is obtained which is eminently suitable for the production of plastic masses.

The polycondensation products obtained according to the invention are advantageous in that they may be stored over long periods, have particular fastness to light, are not brittle and are highly resistant to solvents.

The advantages of the method according to the invention, inherent in the elimination of a second process stage and consequent material simplification, increased economy and reduced time and cost, are manifest.

I claim:

1. The process of preparing a light colored condensation product of a mono-amine of the general formula

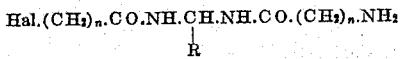

wherein Hal means halogen, $n$ is an integer from 1 to 6, and R is a member of the group consisting of H, $CH_3$, $CCl_3$, and $C_6H_5$, which comprises reacting a bis-amide of the formula

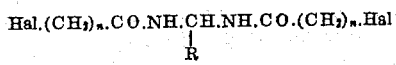

where Hal, $n$, and R have the same meanings, respectively, with one mol of liquid ammonia at room temperature, in the presence of a nitrogenous heterocyclic catalyst selected from the group consisting of pyridine, piperidine, and quinoline, and recovering the condensation product thus obtained.

2. The process of claim 1, wherein the reaction is conducted under a pressure below about 1 mm. mercury.

3. The process of claim 1, wherein the bis-amide is methylene-bis-chlorpropionic acid amide.

4. The processs of claim 1, wherein the bis-amide is ethylidene-bis-chlorpropionic acid amide.

5. The process of claim 1, wherein the bis-amide is benzylidene-bis-bromopropionic acid amide.

6. The process of claim 1, wherein the bis-amide is trichloroethylidene-bis-chlorpropionic acid amide.

References Cited in the file of this patent

UNITED STATES PATENTS

| | | |
|---|---|---|
| 2,176,896 | Epstein | Oct. 24, 1939 |
| 2,293,388 | Hanford | Aug. 18, 1942 |
| 2,356,702 | Schlack | Aug. 22, 1944 |
| 2,436,363 | Marvel | Feb. 17, 1948 |
| 2,537,689 | Mowry et al. | Jan. 9, 1951 |

OTHER REFERENCES

Marvel et al.: J. Amer. Chem. Soc., vol. 68, No. 9, pages 1681–1686.

Hackh's Chemical Dictionary, 3rd edition, 1944, pages 664 and 665.